(12) United States Patent
Crickmore et al.

(10) Patent No.: US 9,243,949 B2
(45) Date of Patent: Jan. 26, 2016

(54) FIBRE OPTIC DISTRIBUTED SENSING

(75) Inventors: Roger Ian Crickmore, Dorchester (GB); Alastair Godfrey, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 389 days.

(21) Appl. No.: 13/979,262

(22) PCT Filed: Jan. 16, 2012

(86) PCT No.: PCT/GB2012/000038
§ 371 (c)(1),
(2), (4) Date: Jul. 11, 2013

(87) PCT Pub. No.: WO2012/095640
PCT Pub. Date: Jul. 19, 2012

(65) Prior Publication Data
US 2013/0291642 A1  Nov. 7, 2013

(30) Foreign Application Priority Data
Jan. 14, 2011 (GB) .................................. 1100636.8

(51) Int. Cl.
*G02B 6/00* (2006.01)
*G02B 6/032* (2006.01)
(Continued)

(52) U.S. Cl.
CPC .................. *G01H 9/00* (2013.01); *G01D 5/353* (2013.01); *G01H 9/004* (2013.01); *G02B 6/00* (2013.01)

(58) Field of Classification Search
CPC ..... E21B 43/26; E21B 47/01; E21B 47/0006; G01M 11/319; G02B 6/00; G02B 6/10; G01D 5/268; G01D 5/353; G01D 5/35361; G01H 9/00; G01H 9/004
USPC ........... 385/12–13, 32, 123–128; 250/227.11, 250/227.14, 227.15, 227.18; 702/189; 715/764; 356/32, 448, 450, 477; 73/152.16, 655
See application file for complete search history.

(56) References Cited

U.S. PATENT DOCUMENTS 5,194,847 A  3/1993  Taylor et al.
6,611,633 B1  8/2003  Vohra et al.
(Continued)

FOREIGN PATENT DOCUMENTS

EP  1953536  8/2008
EP  2 418 466  2/2012
(Continued)

OTHER PUBLICATIONS

Bao,, et al., "Development and applications of the distributed temperature and strain sensors based on Brillouin scattering", Proceedings of the IEEE Sensors, 3:1210-1213 (2004).

*Primary Examiner* — Akm Enayet Ullah
*Assistant Examiner* — Michael Mooney
(74) *Attorney, Agent, or Firm* — McDonnell Boehnen Hulbert & Berghoff LLP

(57) ABSTRACT

This application describes methods and apparatus for fiber optic distributed acoustic sensing (DAS) where microstructured fiber (202), such as holey fiber or photonic crystal fiber is used as the sensing fiber (104). The microstructured fiber is configured so to provide at least one of enhanced sensitivity to a given incident acoustic signal; an enhanced non-linear optical power threshold and directional sensitivity. By configuring the microstructured fiber to be more compliant than an equivalent solid fiber and/or provide a large refractive index variation in response to applied strain, the response to a given acoustic stimulus may be larger than for the equivalent fiber, Providing a hollow core may allow higher optical powers and by providing a directionality to microstructured (304) allows the fiber to be used in a DAS system with a directional response.

19 Claims, 1 Drawing Sheet

(51) Int. Cl.
*G01J 1/42* (2006.01)
*G02B 6/02* (2006.01)
*G01H 9/00* (2006.01)
*G01D 5/353* (2006.01)

(56) References Cited

U.S. PATENT DOCUMENTS 7,496,246 B1 * 2/2009 Ruffa ................. G01D 5/35303
385/13

2006/0126435 A1   6/2006  Tam et al.
2009/0214154 A1   8/2009  Kashiwagi
2012/0111104 A1 * 5/2012  Taverner ................. G01H 9/004
73/152.16

FOREIGN PATENT DOCUMENTS

GB          2414795      7/2006
GB          2442745      4/2008
WO    WO 2006/072025    7/2006

* cited by examiner

FIBRE OPTIC DISTRIBUTED SENSING

FIELD OF THE INVENTION

The present invention relates to fibre optic distributed sensing and in particular to fibre optic distributed sensors such as distributed acoustic sensors in which a sensing fibre is interrogated with pulses of radiation. The invention also relates to optical fibres and fibre optic cables suitable for use in fibre optic distributed sensing.

BACKGROUND OF THE INVENTION

Various sensors utilizing optical fibres are known. Many such sensors rely on fibre optic point sensors or discrete reflection sites such as fibre Bragg gratings or the like being arranged along the length of an optical fibre. The returns from the discrete point sensors or reflection sites can be analysed to provide an indication of the temperature, strain and/or vibration in the vicinity of the discrete sensors or reflection sites.

Fully distributed fibre optic sensors are also known in which the intrinsic scattering from a continuous length of optical fibre is used. Such sensors allow use of standard fibre optic cable without deliberately introduced reflection sites such fibre Bragg gratings or the like. The entire optical fibre from which a backscatter signal can be detected can be used as part of the sensor. Time division techniques are typically used to divide the signal returns into a number of time bins, with the returns in each time bin corresponding to a different portion of the optical fibre. Such fibre optic sensors are referred to as distributed fibre optic sensors as the sensor portions are fully distributed throughout the entire optical fibre. As used in this specification the term distributed fibre optic sensor will be taken to mean a sensor in which the optical fibre itself constitutes the sensor and which does not rely on the presence of specific point sensors or deliberately introduced reflection or interference sites, that is an intrinsic fibre optic sensor.

U.S. Pat. No. 5,194,847 describes a distributed acoustic fibre optic sensor for intrusion sensing. A continuous optical fibre without any point sensors or specific reflection sites is used. Coherent light is launched into the optical fibre and any light which is Rayleigh backscattered within the optical fibre is detected and analysed. A change in the backscattered light in a time bin is indicative of an acoustic or pressure wave incident on the relevant portion of optical fibre. In this way acoustic disturbances on any portion of the fibre can be detected.

GB patent application publication No. 2,442,745 describes a distributed acoustic fibre optic sensor system wherein acoustic vibrations are sensed by launching a plurality of groups of pulse modulated electromagnetic waves into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group.

Distributed fibre optic sensing therefore provides useful and convenient sensing solutions that can monitor long lengths of optical fibre. Standard telecommunications optical fibre, e.g. single mode optical fibre, can be used which means that the sensing fibre is relatively cheap and readily available and, in some instances, it may be possible to use existing optical fibres for acoustic monitoring say.

In some instances though the use of standard telecommunications fibre optic cable may not provide optimal sensing.

SUMMARY OF THE INVENTION

According to a first aspect of the present invention there is provided a fibre optic distributed acoustic sensor comprising an interrogator unit and an optical fibre, the interrogator unit being configured to transmit optical pulse into said optical fibre and detect radiation backscattered from within the fibre wherein said optical fibre comprises a microstructured optical fibre wherein the microstructure to configured so as to provided at least one of an enhanced sensitivity to a given incident acoustic signal; an enhanced non-linear optical power threshold and directional sensitivity.

Microstructured optical fibres are optical fibres having microstructures within the fibre which contribute to the light guiding within the fibre. Typically such fibres may be formed from a single type of material and do not rely on dopants or the like for cladding, although in some embodiments there may be some degree of doping or different cladding materials combined with the microstructures.

Microstructured optical fibres include photonic band-gap fibres which rely on photonic band gap effects to provide guiding and also holey fibres where the microstructures control the effect refractive index of the material around the core so as to achieve light guiding within the core. For the purposes of this specification holey fibres include hole-assisted fibres wherein the cladding does consist of a solid material having a different refractive index to the core but the cladding also comprises holes to modify the effective refractive index. Also known are Bragg fibres. In general the term microstructured fibre is taken to encompass any type of photonic crystal fibre.

Various types of holey fibre and photonic band gap fibre are known and may be used. Typically holey fibres have a solid core. Photonic band gap fibres typically have a hollow core.

It will be clear from the above that the microstructured fibres typically comprise hollow sections as part of the fibre, with the hollow sections being arranged to provide light guiding effects. By contrast most conventional optical fibre consists of a solid core material surrounded by at least one solid cladding material.

As the microstructured fibre is not fully solid and indeed often has a significant number of hollow sections, it may be configured to be more compliant than a relatively equivalent solid fibre, i.e. to deform more readily in response to a given stimulus. For many applications this may be an undesirable aspect and such a microstructured fibre would need to be suitably protected. However the present inventors have realised that this can be an advantage for distributed acoustic sensing and correct arrangement of the microstructure can lead to an enhanced sensitivity to a given incident acoustic signal. By enhanced sensitivity is meant that an incident signal of a given intensity will lead to a greater detectable change in the characteristics of the backscattered radiation than would be the case for an equivalent sully solid fibre. By an equivalent fully solid fibre is meant one with a solid core of the same diameter as the effective core of the microstructured fibre.

Distributed acoustic sensing relies on acoustic disturbances disturbing the fibre, effectively applying a transient strain, and thus changing the characteristics of the radiation which is Rayleigh backscattered within the fibre. For a more compliant fibre the amount of disturbance can be greater for any given acoustic stimulus than for a less compliant fibre. Thus the microstructured fibre may experience a greater disturbance than a fully solid optical fibre would when exposed to the same stimulus, which in effect mean that a sensor using microstructured fibre is more sensitive than one using conventional solid fibre.

Thus the fibre of embodiments of the present invention may be provided with an enhanced sensitivity to a given incident acoustic signal by configuring the microstructure to be highly compliant, i.e. readily deformable or flexible in response to an incident acoustic signal.

Further, the microstructure may be configured such that the effect of strain on the effective refractive index of the waveguide portion of the fibre may be relatively greater for a microstructured fibre as compared to a conventional solid fibre. Again, in some applications this may be a disadvantage but again in specific application of distributed acoustic sensing having the refractive index vary relatively strongly with strain, such as due to incident acoustic signals, may be advantageous in providing a more sensitive fibre.

In some embodiments the microstructured fibre may be structured so as to exhibit a relatively strong dependence on refractive index to strain. By appropriately configuring the microstructures within the fibre a relatively strong strain dependence may be achieved. Such a fibre could provide much greater sensitivity than conventional fully solid fibres.

In a further arrangement the microstructure could be configured so that the fibre has a directional sensitivity. A directional sensitivity could be achieved by arranging the fibre so that it more readily deforms in one direction compared to another direction and/or exhibits a stronger change in refractive index if deformed in one direction as compared to another direction.

For instance the microstructure could comprise a series of hollow sections joined by connecting sections to form a sort of web or honeycomb type structure. If the supporting sections are stronger in one direction than another the fibre may experience a greater deformation in response to acoustic signals incident from one direction than from an orthogonal direction. Additionally or alternatively the hollow sections may be arranged so that incident signals from one direction cause deformation resulting in a relatively strong change in refractive index whereas incident signals from an orthogonal direction result in no or a relatively low change in refractive index. The two orthogonal directions may be different transverse directions (to the path of the fibre), i.e. two directions which are both orthogonal to the axis of the fibre.

If the fibre exhibits a significant difference in sensitivity to incident acoustic signals from different direction the fibre will exhibit directional sensitivity. Directional sensitivity in a DAS sensor can be very advantageous in locating the source of acoustic signals and/or identifying the different components of an acoustic signal such as a seismic signal.

As mentioned the microstructured fibre may have either a solid core or a hollow core depending on the arrangement. However in some embodiments a hollow core microstructured fibre such as a photonic band gap fibre may be configured to provide an enhance non-linear optical power threshold which can be advantageous.

In fibre optic distributed acoustic sensors where the fibre is interrogated with pulses of radiation and radiation which is Rayleigh backscattered is detected is it typically necessary to avoid certain non-linear effects within the fibre. One such non-linear effect is modulation instability. Another non-linear effect is stimulated Brillouin scattering.

In hollow core fibres the core will generally fill with air (unless deliberately filled with some other gas). The skilled person will appreciate that the power thresholds for non-linear effects may be higher for transmission through air than for transmission through solid core material. Thus optical pulses of greater optical power, i.e. greater intensity, may be used in an air core waveguide than with a solid core waveguide without experiencing unwanted non-linear effects. This is advantageous as the effective length of fibre which can be monitored by a distributed acoustic sensor is partly dependent on the intensity of the interrogating pulse and increasing the intensity increases the operating range.

In another aspect of the present invention there is provided a method of distributed acoustic sensing comprising, launching at least one pulse of optical radiation into an optical fibre and detecting radiation backscattered from within the fibre wherein the optical fibre is a microstructured optical fibre configured to provide at least one of an enhanced sensitivity to a given incident acoustic signal; an enhanced non-linear optical power threshold and directional sensitivity.

Detecting backscattered radiation conveniently comprises detecting radiation which is Rayleigh backscattered. The method may also comprise processing the detected backscatter to determine the acoustic signals incident on a plurality of sensing portions of the fibre.

The method of this aspect of the invention provides all of the same advantages of the first aspect of the present invention. In particular it allows the use of fibre which is more compliant that conventional optical fibre and thus more sensitive to acoustic stimulus. Further the fibre may be specifically arranged to exhibit a strong dependence of refractive index with strain, which would be contrary to what was required for most applications. The fact that the properties of the microstructured fibre can be tailored by changing the design of the microstructures makes microstructured fibre particularly useful in this regard.

The microstructured fibre may have a hollow core and thus may allow high launch powers for the optical radiation, i.e. higher intensity pulses, than would be the case than using a solid core optical fibre.

The present invention therefore generally relates to the use, in a fibre optic distributed acoustic sensor, of microstructured optical fibre configured to provide at least one of an enhanced sensitivity to a given incident acoustic signal; an enhanced non-linear optical power threshold and directional sensitivity.

DESCRIPTION OF THE DRAWINGS

The invention will now be described by way of example only with respect to the following drawings of which.

DESCRIPTION OF THE INVENTION

Figure 1:
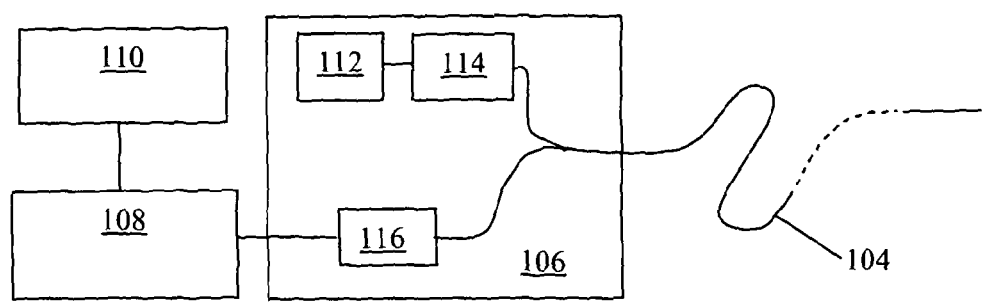
FIG. 1 illustrates the basic components of a distributed fibre optic sensor.

FIG. 1 shows a schematic of a fibre optic distributed acoustic sensing (DAS) arrangement. A length of sensing fibre 104 is connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometres in length, for example it may be approximately 40 km long. In conventional applications of optical fibre distributed sensors the sensing fibre is at least partly contained within a medium which it is wished to monitor. For example, the fibre 104 may be buried in the ground to provide monitoring of a perimeter or monitoring of a buried asset such as a pipeline or the like.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is backscattered from the intrinsic scattering sites within the fibre 104.

The signal from the photodetector is processed by signal processor 108. The signal processor conveniently demodulates the returned signal based on the frequency difference between the optical pulses such as described in GB2,442,745. The signal processor may also apply a phase unwrap algorithm as described in GB2,442,745.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. The spatial resolution of the sensing portions of optical fibre may, for example, be approximately 10 m, which for a 40 km length of fibre results in the output of the interrogator taking the form of 4000 independent data channels.

In this way, the single sensing fibre can provide sensed data which is analogous to a multiplexed array of adjacent independent sensors, arranged in a linear path.

Conventional distributed fibre optic sensors use standard telecommunications optical fibre. The present invention provides involves use of fibre with improved properties for distributed acoustic sensing.

The invention uses microstructured optical fibre as the sensing fibre 104. Microstructured optical fibres, sometimes referred to as photonic crystal fibres, (PCF) are a class of optical fibre based on the properties of photonic crystals. Embodiments of the present invention use microstructured fibre which is configured so as to exhibit at least one of enhanced sensitivity to incident acoustic signals, enhanced non-linear optical power threshold and directional sensitivity.

Figure 2:
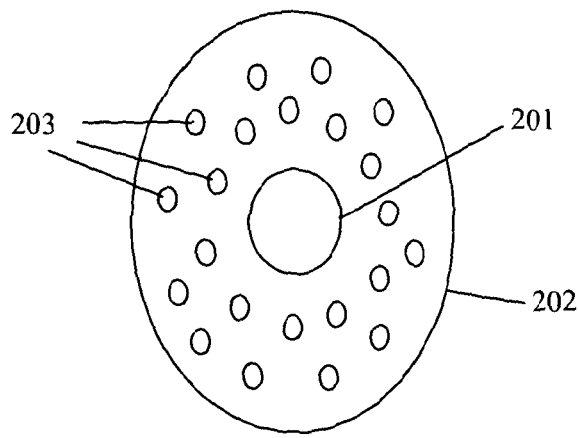
FIG. 2 illustrates a microstructured fibre.

Two types of microstructured fibre are illustrated with reference to FIG. 2 (which is not to scale). FIG. 2 shows a fibre cross section having a core region, 201, surrounding by a cladding region 202. The cladding region comprises a number of holes 203 running throughout the fibre.

In a holey fibre the core 201 is typically solid, as is the cladding material 202. The size, location and/or number of holes 203 are arranged so as to change the effective refractive index of the cladding region that there is a difference between the refractive index of the core and cladding materials which provides light guiding. In some embodiments the cladding region is made from exactly the same material as the core region and the core region is defined by the holes. In some embodiments however the cladding may be slightly doped so that it has a different refractive index to the core and the holes are provide to modify further the refractive index of the cladding region.

Another type of microstructure fibre is a photonic band gap. In such a fibre the core region 201 is typically hollow. The cladding region is typically very densely packed with holes 203. The arrangement of the holes creates a photonic band gap and confines guiding of light in the core. In some embodiments the holes may instead by replaced with areas of material of a different refractive index to the cladding.

It can be seen from FIG. 2 that the cross section of a microstructured fibre may comprise a relatively large amount of hollow space in total. Thus a microstructured fibre may be arranged to be more compliant that an equivalent fully solid optical fibre, i.e. it may bend more readily and or generally be less stiff. In many applications this may an undesirable aspect that it dealt with by incorporating the fibre in a stiff jacket or a stiff cable. In the present invention however the compliance is desirable and the fibre will be jacketed in relatively compliant material. Thus in embodiments of the present invention the microstructured is arranged to increase the compliance of the fibre.

This compliance means that any incident acoustic stimulus will lead to a greater degree of bending than would be the case for a conventional fully solid fibre. This will lead to a relatively large change in the radiation backscattered from the fibre. Hence suitably configured microstructured optical fibre provides a relatively sensitive sensing fibre.

The properties of the microstructured fibre are determined by the size, number and location of the holes 203 in relation to the core 201. In one embodiment the microstructured optical fibre is designed to exhibit a strong refractive index dependence on strain. This is contrary to what may be required in many applications but can provide an even more sensitive fibre. The skilled person will appreciate that by configuring the microstructure so that the hole density changes significantly in response to strain the refractive index of the fibre in response to strain can be made significant.

In embodiments where the core 201 is hollow the optical power that may be launched into the core before onset of undesirable non-linear effect may be increased as compared to solid core material and thus hollow core microstructured optical fibre can be particularly advantageous in some applications.

Figure 3:
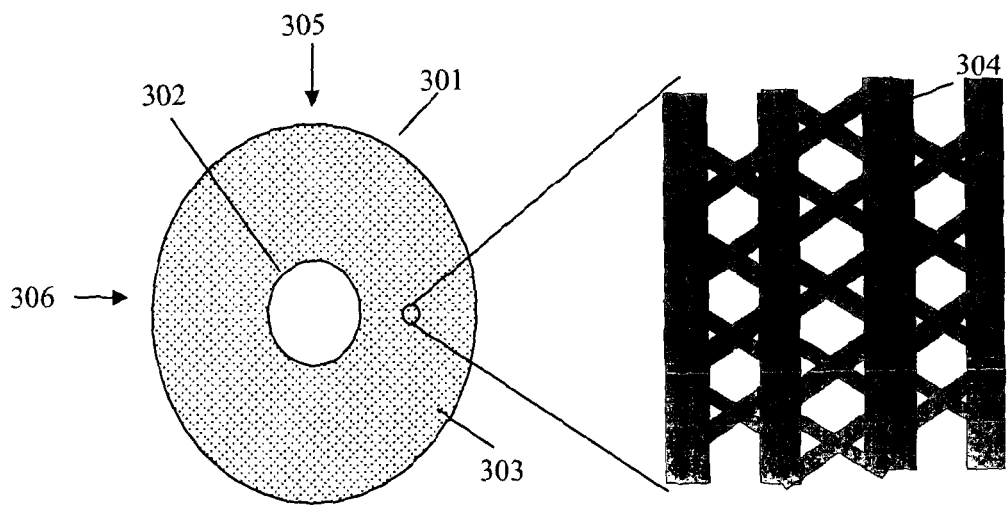
FIG. 3 illustrates another microstructured fibre configured so as to have directional sensitivity.

Additionally or alternatively the microstructure may be configured so as that the degree of bending or deformation of the fibre in response to a given incident acoustic signal may vary according to the direction of incidence. In other words the fibre may be arranged to offer directional sensitivity. For example FIG. 3 illustrates a fibre 301 with directional sensitivity. FIG. 3 shows a core 302 surrounded by a microstructured region 302. As the skilled person will appreciate in some fibres a microstructured region may be formed as a web like structure 304 as schematically illustrated in the expanded section. Typically the web may be arranged so that there is no significant directionality to the structure. In the embodiment shown in FIG. 3 however the web is arranged so that the solid material is thicker in one direction that in the other directions. The web shown in FIG. 3 thus has thicker materially running generally vertically than the material in other directions. A microstructure such as illustrated in FIG. 3 may therefore respond differently to strains from different direction. The fibre may thus be much less compliant in direction 305 than in direction 306 and thus the fibre may be much more sensitive to acoustic signals incident from direction 306 than from direction 305. Directional sensitivity can be advantageous in some applications of a DAS sensor as it can allow the location of an acoustic source to be determined and/or an acoustic signal to be resolved into different components.

Directional sensitivity may be designed into the microstructure in other ways and the effect on refractive index described above may also be directionally sensitive by careful arrangement of the holes.

The invention claimed is:

1. A fibre optic distributed acoustic sensor comprising an interrogator unit and an optical fibre, the interrogator unit being configured to transmit optical pulse into said optical fibre and detect radiation backscattered from within the fibre wherein said optical fibre comprises a micro structured optical fibre wherein the microstructure is configured so as to provide different sensitivity to incident acoustic stimuli from different directions transverse to the path of the fiber.

2. A sensor as claimed in claim 1 wherein said microstructured optical fibre comprises a photonic band-gap fibre.

3. A sensor as claimed in claim 2 wherein said photonic band-gap fibre comprises a core region surrounded by a plurality of holes, the holes arranged to provide light guiding within the core region.

4. A sensor as claimed in claim 3 wherein said core region is hollow.

5. A sensor as claimed in claim 1 wherein said microstructured optical fibre comprises a holey fibre comprising a core region surrounded by a cladding region comprising a plurality of holes, the holes being arranged to effectively control the refractive index of the cladding region so as to provide light guiding within the core.

6. A sensor as claimed in claim 5 wherein said microstructured optical fibre comprises a hole-assisted fibre wherein the cladding comprises of a solid material having a different refractive index to the core.

7. A sensor as claimed in claim 1 wherein said microstructured optical fibre comprises a Bragg fibre.

8. A sensor as claimed in claim 1 wherein the microstructured fibre is configured to be more compliant than an equivalent fully solid optical fibre.

9. A sensor as claimed in claim 1 wherein the microstructured fibre is configured so as to exhibit a strong dependence on refractive index to strain.

10. A sensor as claimed in claim 1 wherein the microstructured fibre is configured so as to be more compliant in one transverse direction than the orthogonal transverse direction.

11. A sensor as claimed in claim 1 wherein the microstructured fibre is configured so as to exhibits a stronger change in refractive index if deformed in one transverse direction as compared to the orthogonal transverse direction.

12. A method of distributed acoustic sensing comprising, launching at least one pulse of optical radiation into an optical fibre and detecting radiation backscattered from within the fibre wherein the optical fibre is a microstructured optical fibre configured to provide different sensitivity to incident acoustic stimuli from different directions transverse to the path of the fiber.

13. A method as claimed in claim 12 wherein detecting backscattered radiation comprises detecting radiation which is Rayleigh backscattered.

14. A method as claimed in claim 12 comprising processing the detected backscatter to determine the acoustic signals incident on a plurality of sensing portions of the fibre.

15. A method as claimed in claim 12 wherein the microstructured fibre is one of a photonic band gap fibre, a holey fibre and a Bragg fibre.

16. A method as claimed in claim 12 wherein the microstructured fibre is arranged to exhibit a strong dependence of refractive index with strain.

17. A method as claimed in claim 12 wherein the microstructured fibre has a hollow core.

18. A method as claimed in claim 12 wherein the microstructured fibre is configured so as to be more compliant in one transverse direction than the orthogonal transverse direction.

19. A method as claimed in claim 12 wherein the microstructured fibre is configured so as to exhibits a stronger change in refractive index if deformed in one transverse direction as compared to the orthogonal transverse direction.

* * * * *